(12) United States Patent
Rayanchu

(10) Patent No.: US 12,380,175 B2
(45) Date of Patent: *Aug. 5, 2025

(54) DYNAMIC RADIUS THRESHOLD SELECTION

(71) Applicant: GOOGLE LLC, Mountain View, CA (US)

(72) Inventor: Shravan Rayanchu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,423

(22) Filed: Jul. 28, 2023

(65) Prior Publication Data

US 2023/0367827 A1 Nov. 16, 2023

Related U.S. Application Data

(63) Continuation of application No. 17/101,803, filed on Nov. 23, 2020, now Pat. No. 11,755,674, which is a
(Continued)

(51) Int. Cl.
*G06F 16/00* (2019.01)
*G06F 16/22* (2019.01)
(Continued)

(52) U.S. Cl.
CPC ...... *G06F 16/9537* (2019.01); *G06F 16/2228* (2019.01); *G06F 16/248* (2019.01);
(Continued)

(58) Field of Classification Search
CPC ............. G06F 16/9537; G06F 16/2228; G06F 16/954; G06F 16/248; G06F 16/29;
(Continued)

(56) References Cited

U.S. PATENT DOCUMENTS 7,089,264 B1 8/2006 Guido et al.
7,310,777 B2 * 12/2007 Cirne .................... G06F 11/323
714/E11.181
(Continued)

FOREIGN PATENT DOCUMENTS

WO WO2005117479 A1 * 12/2005
WO WO-2007/143106 A2 12/2007
(Continued)

OTHER PUBLICATIONS

A. Morton, Performance Metrics for All, IEEE Internet Computing jly-Aug. 2009, (vol. 13, Issue: 4, pp. 82-86).*
(Continued)

*Primary Examiner* — Srirama Channavajjala
(74) *Attorney, Agent, or Firm* — MARSHALL, GERSTEIN & BORUN LLP

(57) ABSTRACT

Methods and systems for selecting content for a computing device are described. In some embodiments, the method comprises: receiving, by one or more processors of a data processing system, from a client computing device, location data of the client computing device; identifying, by the data processing system, an entity around a location of the client computing device; identifying, by the data processing system, a radius threshold corresponding to the entity based on a performance metric criterion; determining, by the data processing system, that a distance between the client computing device and the entity is less than the radius threshold corresponding to the entity; and transmitting, by the data processing system, responsive to the determination, to the client computing device, a content item associated with the entity.

14 Claims, 4 Drawing Sheets

Related U.S. Application Data continuation of application No. 15/189,816, filed on Jun. 22, 2016, now Pat. No. 10,846,353, which is a continuation of application No. 14/225,007, filed on Mar. 25, 2014, now abandoned.

(51) Int. Cl.

| | | |
|---|---|---|
| *G06F 16/248* | (2019.01) | |
| *G06F 16/29* | (2019.01) | |
| *G06F 16/3331* | (2025.01) | |
| *G06F 16/9537* | (2019.01) | |
| *G06F 16/954* | (2019.01) | |
| *G06F 40/205* | (2020.01) | |
| *G06N 20/00* | (2019.01) | |
| *G06Q 30/0251* | (2023.01) | |
| *H04L 43/16* | (2022.01) | |
| *H04L 51/222* | (2022.01) | |
| *H04L 67/52* | (2022.01) | |
| *H04W 4/02* | (2018.01) | |
| *H04W 4/021* | (2018.01) | |

(52) U.S. Cl.
CPC .......... *G06F 16/29* (2019.01); *G06F 16/3331* (2019.01); *G06F 16/954* (2019.01); *G06F 40/205* (2020.01); *G06N 20/00* (2019.01); *G06Q 30/0256* (2013.01); *G06Q 30/0261* (2013.01); *H04L 43/16* (2013.01); *H04L 51/222* (2022.05); *H04L 67/52* (2022.05); *H04W 4/021* (2013.01); *H04W 4/025* (2013.01)

(58) Field of Classification Search
CPC . G06F 16/3331; G06F 40/205; H04L 51/222; H04L 67/52; H04L 43/16; G06Q 30/0256; G06Q 30/0261; H04W 4/021; H04W 4/025; G06N 20/00
See application file for complete search history.

(56) References Cited

U.S. PATENT DOCUMENTS

| | | | |
|---|---|---|---|
| 7,693,982 B2 * | 4/2010 | Goldszmidt | G06Q 10/04 714/39 |
| 7,783,644 B1 | 8/2010 | Petrou et al. | |
| 8,135,505 B2 | 3/2012 | Vengroff et al. | |
| 8,364,627 B2 | 1/2013 | Canny et al. | |
| 8,385,964 B2 | 2/2013 | Haney | |
| 8,442,976 B2 | 5/2013 | Diederiks et al. | |
| 8,504,062 B2 | 8/2013 | Weiss | |
| 8,538,676 B2 | 9/2013 | Wuersch et al. | |
| 8,671,106 B1 | 3/2014 | Lee et al. | |
| 8,769,085 B2 * | 7/2014 | Beeco | H04L 41/0677 709/224 |
| 8,886,641 B2 * | 11/2014 | Dong | G06F 16/9535 707/725 |
| 9,177,068 B2 | 11/2015 | Lam et al. | |
| 9,672,754 B2 * | 6/2017 | Yuen | A61B 5/222 |
| 9,872,147 B2 | 1/2018 | Wang et al. | |
| 2003/0004802 A1 | 1/2003 | Callegari | |
| 2004/0260465 A1 | 12/2004 | Tu | |
| 2005/0038599 A1 | 2/2005 | Lehmann et al. | |
| 2005/0102097 A1 | 5/2005 | Tanizaki et al. | |
| 2005/0278378 A1 | 12/2005 | Frank | |
| 2006/0155597 A1 | 7/2006 | Gleason | |
| 2006/0287810 A1 | 12/2006 | Sadri et al. | |
| 2007/0060185 A1 | 3/2007 | Simon et al. | |
| 2007/0156435 A1 | 7/2007 | Greening et al. | |
| 2007/0174375 A1 * | 7/2007 | Anim-Appiah | H03H 17/0294 708/300 |
| 2007/0282621 A1 | 12/2007 | Altman et al. | |
| 2008/0010605 A1 | 1/2008 | Frank | |
| 2008/0313039 A1 | 12/2008 | Altberg et al. | |
| 2009/0005068 A1 | 1/2009 | Forstall et al. | |
| 2009/0012953 A1 * | 1/2009 | Chu | G06F 16/29 707/999.005 |
| 2009/0132163 A1 * | 5/2009 | Ashley, Jr. | G01S 5/0045 701/467 |
| 2009/0235267 A1 * | 9/2009 | McKinney | G06F 11/328 718/104 |
| 2009/0315995 A1 | 12/2009 | Khosravy et al. | |
| 2010/0082421 A1 | 4/2010 | Tuladhar et al. | |
| 2010/0088018 A1 | 4/2010 | Tsurutome et al. | |
| 2011/0055204 A1 | 3/2011 | Jung | |
| 2011/0066369 A1 * | 3/2011 | Klassen | G01C 21/20 701/465 |
| 2011/0218985 A1 | 9/2011 | Camper | |
| 2011/0276565 A1 | 11/2011 | Zheng et al. | |
| 2011/0307174 A1 | 12/2011 | Uusitalo | |
| 2011/0313874 A1 | 12/2011 | Hardie et al. | |
| 2012/0011137 A1 | 1/2012 | Sheha et al. | |
| 2012/0290383 A1 | 11/2012 | Busch | |
| 2012/0317087 A1 | 12/2012 | Lymberopoulos et al. | |
| 2013/0110847 A1 | 5/2013 | Sahuguet et al. | |
| 2013/0204706 A1 | 8/2013 | Tang et al. | |
| 2013/0237254 A1 | 9/2013 | Papakipos et al. | |
| 2013/0260795 A1 | 10/2013 | Papakipos et al. | |
| 2013/0339345 A1 | 12/2013 | Soto Matamala et al. | |
| 2013/0345957 A1 * | 12/2013 | Yang | G06F 16/24578 706/56 |
| 2014/0180738 A1 * | 6/2014 | Phillipps | G06N 20/10 705/7.38 |
| 2014/0195466 A1 * | 7/2014 | Phillipps | G06F 16/00 706/12 |
| 2014/0274022 A1 * | 9/2014 | Bell | H04W 8/08 455/418 |
| 2014/0365944 A1 | 12/2014 | Moore et al. | |
| 2015/0011187 A1 | 1/2015 | Wetzold | |
| 2015/0134463 A1 * | 5/2015 | Jalali | G06Q 30/0275 705/14.71 |
| 2015/0170077 A1 * | 6/2015 | Kara | G06F 16/285 705/7.38 |
| 2015/0289091 A1 * | 10/2015 | Lv | H04W 4/02 455/456.1 |

FOREIGN PATENT DOCUMENTS

| | | | |
|---|---|---|---|
| WO | WO2008054493 A2 * | 5/2008 | |
| WO | WO-2008/134595 A1 | 11/2008 | |
| WO | WO-2009/126231 A1 | 10/2009 | |
| WO | WO-2011/017199 A2 | 2/2011 | |
| WO | WO-2011/109751 A1 | 9/2011 | |
| WO | WO-2013/015852 A1 | 1/2013 | |
| WO | WO2013089837 A1 * | 6/2013 | |
| WO | WO2014036685 A1 * | 3/2014 | |

OTHER PUBLICATIONS

Naeem Seliya et al., "A Study on the Relationships of Classifier Performance Metrics", 2009 21st IEEE International Conference on Tools Artificial Intelligence, Nov. 2009, pp. 59-66.*

A. Mohamed et al., "Context Dependent Controller by Overlapped Neural Networks for Performance Metrics Revision", 2006 5th IEEE International Conference on Cognitive Informatcs (vol. 1, 2006, pp. 507-516).*

Final Office Action for U.S. Appl. No. 15/189,816 dated Apr. 2, 2020, 14 pages.

Final Office Action for U.S. Appl. No. 15/189,816 dated Aug. 7, 2019, 21 pages.

Non-Final Office Action for U.S. Appl. No. 14/225,007 dated Mar. 23, 2016, 12 pages.

Non-Final Office Action for U.S. Appl. No. 14/225,007 dated Sep. 25, 2015, 12 pages.

Non-Final Office Action for U.S. Appl. No. 15/189,816 dated Apr. 25, 2019, 14 pages.

Non-Final Office Action for U.S. Appl. No. 15/189,816 dated Dec. 18, 2019, 12 pages.

(56) References Cited

OTHER PUBLICATIONS

Notice of Allowance for U.S. Appl. No. 15/189,816 dated Aug. 5, 2020, 9 pages.
Wang et al., " Processing of Continuous Location-BasedRange Queries on Moving Objectsin Road Networks", IEEE Transactions on Knowledge and Data Engineering, vol. 23, No. 7, Jul. 2011,pp. 1065-1078.
Dmytro Karamshuk et al., "Geo-Spotting: Mining Online Location-based Services for Optimal Retail Store Placement", KDD '13: Proceedings of the 19th ACM SIGKDD international conference on Knowledge discovery and data mining, Aug. 2013 pp. 793-801.

* cited by examiner

DYNAMIC RADIUS THRESHOLD SELECTION

CROSS-REFERENCE TO RELATED APPLICATION

The present application claims priority as a continuation application under 35 U.S.C. § 120 as a continuation of U.S. patent application Ser. No. 17/101,803, filed on Nov. 23, 2020, issued as U.S. Pat. No. 11,755,674 on Sep. 12, 2023, and titled "Dynamic Radius Threshold Selection," which is the continuation of and claims priority to U.S. patent application Ser. No. 15/189,816, filed on Jun. 22, 2016, issued as U.S. Pat. No. 10,846,353 on Nov. 24, 2020, and titled "Dynamic Radius Threshold Selection," which is the continuation of and claims priority to U.S. patent application Ser. No. 14/225,007, filed on Mar. 25, 2014, deemed as abandoned on Oct. 31, 2016, and titled "Dynamically Determining A Search Radius To Select Online Content." The contents of the foregoing applications are hereby incorporated herein by reference in their entireties.

BACKGROUND

Computing devices can be located a distance away from an entity location. Network activity associated with electronic content for the entity location can be based on the distance between the computing device and the entity location.

SUMMARY

An aspect of the present disclosure is directed to a method for selecting content for a computing device. The method comprises: receiving, by one or more processors of a data processing system, from a client computing device, location data of the client computing device; identifying, by the data processing system, an entity around a location of the client computing device; identifying, by the data processing system, a radius threshold corresponding to the entity based on a performance metric criterion; determining, by the data processing system, that a distance between the client computing device and the entity is less than the radius threshold corresponding to the entity; and transmitting, by the data processing system, responsive to the determination, to the client computing device, a content item associated with the entity.

In some embodiments, identifying the radius threshold corresponding to the entity includes: associating a set of distance values between a plurality of entities and a plurality of client computing devices with a set of performance metric values; determining a distance value of the set of distance values associated with a performance metric value that satisfies the performance metric criterion; and identifying the distance value as the radius threshold.

In some embodiments, identifying the radius threshold corresponding to the entity includes: associating a set of features with (1) a set of indications of interest in content items associated with a plurality of entities and (2) a set of distance values between a plurality of client computing devices and the plurality of entities, wherein the set of features is associated with at least one of the plurality of entities, the plurality of client computing devices, or search queries from the plurality of client computing devices; obtaining one or more features, wherein the one or more features are associated with at least one of the entity, the client computing device, or a search query from the client computing device; determining a distance value of the set of distance values associated with (1) the one or more features and (2) an indication of interest, wherein a performance metric value determined based on the indication of interest satisfies the performance metric criterion; and identifying the distance value as the radius threshold.

In some embodiments, associating the set of features with the set of indications of interest includes: predicting likelihood of interest in the plurality of entities based on at least one feature of the set of features; and associating the at least one feature with the set of indications of interest based on the likelihood of interest.

In some embodiments, the one or more features include at least one of a popularity of the entity, a search query vertical associated with the search query, query data associated with the search query, a location of the client computing device, or an activity of the client computing device.

In some embodiments, the one of more features include the popularity of the entity, and wherein the popularity of the entity is positively correlated to a distance from the entity to a client computing device that interacts with a reference associated with the entity.

In some embodiments, identifying the radius threshold includes identifying the radius threshold using a machine learning model.

In some embodiments, the performance metric criterion includes a performance metric value based on at least one of click through rate, conversion rate, rate of requests for directions to a business location, predicted click through rate, cost per click, predicted cost per click, or return on investment.

In some embodiments, the performance metric criterion includes a requirement that a performance metric value associated with the radius threshold exceeds a performance metric threshold.

In some embodiments, the performance metric criterion includes a requirement that a performance metric value associated with the radius threshold have a greatest value among a plurality of performance metric values associated with the entity.

In some embodiments, transmitting the content item associated with the entity includes: identifying a first set of candidate content items based on a search query from the client computing device; selecting a second set of candidate content items from the first set of candidate content items based on indications of interest associated with the first set of candidate content items; identifying one or more candidate content items of the second set of candidate content items, the one or more candidate content items being associated with the entity; selecting the content item from the one or more candidate content; and transmitting, to the client computing device, the content item of the one or more candidate content items.

An aspect of the present disclosure is directed to a system for selecting content for a computing device. The system comprises a data processing system comprising one or more processors, and a network interface in communication with a client computing device. The one or more processors are configured to: receive, from the client computing device, location data of the client computing device; identify an entity around a location of the client computing device; identify a radius threshold corresponding to the entity based on a performance metric criterion; determine that a distance between the client computing device and the entity is less than the radius threshold corresponding to the entity; and transmit, responsive to the determination, to the client computing device, a content item associated with the entity.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
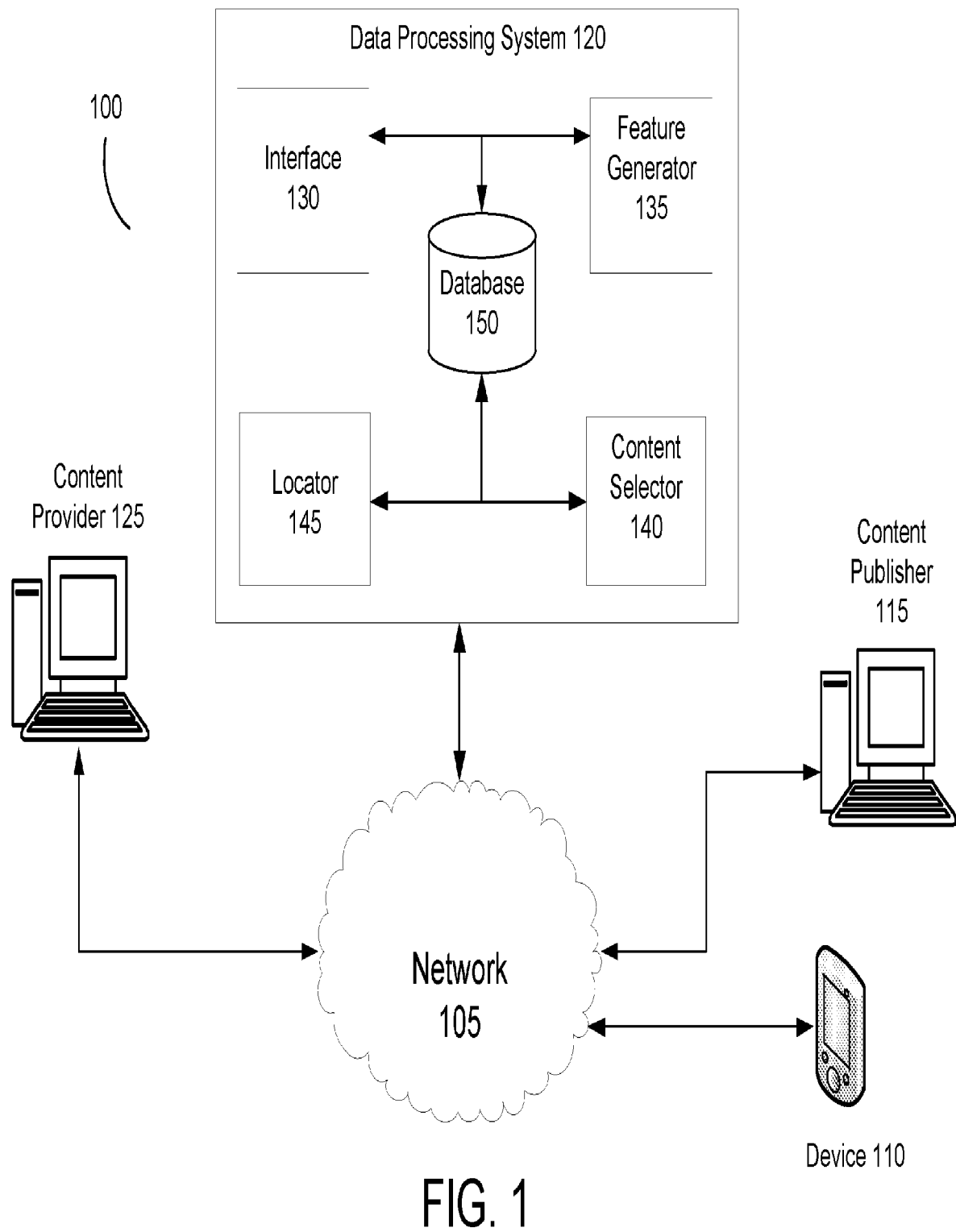
FIG. 1 is an illustration of one implementation of a system to select content items via a computer network.

Systems and methods of the present disclosure relate generally to providing content items (e.g., online documents, advertisements, text, multimedia, images, audio, etc.) associated with business locations. The content items may be displayed alongside search results provided on a webpage by a search engine. A radius threshold can be dynamically selected for a business location based on one or more features or a combination of features. If a location of the device is within the dynamically selected radius threshold of the business location, a content item for the business location may be eligible for display on the device.

Systems and methods of the present disclosure can tune the radius threshold by extracting various features from historical search query logs and sensor data (e.g., Global Positioning System data, accelerometer data, gyroscope data, temperature data, ambient light data, etc.) and correlating these features with indications of interest in the content item (e.g., a click, conversion, or a request for directions to a business location associated with the advertisement). A machine learning mechanism may be used to predict the likelihood of interest in a business location based on these features. In some implementations, the features may include one or more of the following:

Popularity of the business location: A popularity of a business location can be determined based on the number of searches for the business location in a search engine or maps application, or ratings and reviews of the business location. Traveling long distances may be correlated with visiting more popular locations, which may be reflected from receiving clicks from device that are further away as compared to less popular business locations. Thus, a larger radius threshold may be used for popular business locations.

Query vertical: A query vertical for a search query of the historical search query logs can be identified. Search queries such as "coffee shop", "espresso", "latte", "tea" may correspond to query vertical "beverages". Systems and methods may determine that queries corresponding to the "beverages" query vertical result in clicks on advertisements for business locations that are nearby, as compared to query vertical "airports". Therefore, the radius threshold for "coffee shop" may be less than the radius threshold for "San Francisco airport".

Query information: Location terms in a search query can tune or set a radius threshold. A search query containing "pizza palo alto" may generate a radius threshold being set to Palo Alto and nearby areas.

Location of the device: Average driving distances in a geographic location can tune or set a radius threshold (e.g., average driving distances in the Bay area may be different than average driving distances in New York City).

Activity of the device: Device activity (e.g., stationary, walking, driving) identified using data from mobile sensors (e.g., GPS and accelerometer) can tune or set a radius threshold. In illustrative implementations, devices having a device activity corresponding to "stationary" or "walking" may be interested in business locations that are nearby or not interested in business location that are more than a certain distance away from the device.

In some implementations, the present disclosure facilitates showing an advertisement for a business location that is relevant based on a distance between a device and a business location. In an illustrative implementation, showing a coffee shop location that is 20 miles away may not be useful, whereas showing the location of an airport 20 miles away might be useful. Similarly, showing a coffee shop that is 5 miles away to a user who is driving is more useful than showing such information to a user who is stationary or walking.

An offline machine learning process can analyze historical search query logs to determine the optimum radii for one or more features or a combination of features. The data processing system can correlate the presence of a feature or combination of features with the presence of a click or other indication of interest in a content item associated with a business location. The indication of interest may be provided via a device displaying the content item. In some implementations, the indication of interest may include a request for directions to the business location corresponding to the content item. In some implementations, the data processing system assigns a weight to the feature or combination of features based on the correlation (e.g., a higher or lower weight may indicate a level of correlation between the feature combination and indications of interest).

The data processing system may also correlate the indications of interest with a distance between the device providing the indication and the business location. Thus, the data processing system can determine, for a combination of features, a click through rate corresponding to a distance (or range of distances). To generate an optimum radius, the data processing system may then identify, for a feature combination, a distance associated with a click through rate or other performance metric above a threshold (e.g., performance metric threshold). The radius may be an optimum radius because it is correlated with a performance metric that satisfies a performance metric threshold. The performance metric threshold can be predetermined by an administer of the data processing system, or determined by the data processing system to optimize a content campaign or return on investment for a content provider. The performance metric threshold may include a threshold based on click through rate, conversion rate, rate of requests for directions to a business location, predicted click through rate, cost per click, predicted cost per click, return on investment, etc.

FIG. 1 illustrates one implementation of a system 100 for selecting content via a computer network such as network 105. The system 100 and its components, such as a data processing system 120, may include hardware elements, such as one or more processors, logic devices, or circuits. The network 105 can include computer networks such as the Internet, local, wide, metro, data, or other area networks, intranets, satellite networks, combinations thereof, and other communication networks such as voice or data mobile telephone networks. The network 105 can be used to access information resources such as web pages, web sites, domain names, or uniform resource locators that can be displayed on at least one device 110, such as a laptop, desktop, tablet, personal digital assistant, smart phone, mobile computing devices, mobile telecommunication device, wearable computing device, or portable computer. In one implementation, via the network 105 a user of the device 110 can access web pages provided by at least one content publisher 115 (e.g., a web site operator). In this implementation, a web browser of the device 110 can access a web server of the content publisher 115 to retrieve a web page for display on a monitor of the device 110. The content publisher 115 generally includes an entity that operates the web page. In one implementation, the content publisher 115 includes at least one web page server that communicates with the network 105 to make the web page available to the device 110.

Although FIG. 1 shows a network 105 between the device(s) 110, data processing system 120, content provider 125, and content publisher 115, the device(s) 110, content publisher 115, content provider 125 and data processing system 120 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the devices 110 and the data processing system 120, content provider 125, and content publisher 115. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

The system 100 can include at least one data processing system 120. The data processing system 120 can include at least one logic device such as a computing device having a processor to communicate via the network 105 with the device 110, the content publisher 115, and at least one content provider 125. The data processing system 120 can include at least one server. In one implementation, the data processing system 120 can include a plurality of servers located in at least one data center. In some implementations, the data processing system 120 may include multiple, logically-grouped servers and facilitate distributed computing techniques. In one of these implementations, the logical group of servers may be referred to as a server farm or a machine farm. In another of these implementations, the servers may be geographically dispersed. In other implementations, a machine farm may be administered as a single entity. In still other implementations, the machine farm includes a plurality of machine farms. The servers within each machine farm can be heterogeneous—one or more of the servers or machines can operate according to one type of operating system platform.

In one implementation, servers in the machine farm may be stored in high-density rack systems, along with associated storage systems, and located in an enterprise data center. In this implementation, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120, content provider 125, content publisher 115, and device 110 may be deployed or executed on any type of client or server, or any type and form of computing device, such as a computer, network device or appliance capable of communicating on any type and form of network and performing the operations described herein.

In one implementation, the data processing system 120 includes a content placement system having at least one server. The data processing system 120 can also include at least one interface 130, at least one feature generator 135, at least one content selector 140, at least one locator 145, and at least one database 150. In one implementation, the data processing system 120 can include a machine learning module such as a logistic regression module or decision tree module. The interface 130, feature generator 135, content selector 140, locator 145, and machine learning module can each include at least one processing unit or other logic device such as programmable logic array engine, or module configured to communicate with the database 150. The interface 130, feature generator 135, content selector 140, locator 145, and machine learning module can be separate components, a single component, or part of the data processing system 120.

In some implementations, the data processing system 120 obtains anonymous computer network activity information associated with a plurality of devices 110. A user of a device 110 can affirmatively authorize the data processing system 120 to obtain network activity information corresponding to the user's device 110. In one implementation, the data processing system 120 can prompt the user of the device 110 for consent to obtain one or more types of network activity information, such as geographic location information. The identity of the user of the device 110 can remain anonymous and the device 110 may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). In one implementation, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In one implementation, the data processing system 120 receives content or content items from a content provider 125, such as a commercial entity, online retailer, business, advertiser, individual or any entity that wants to provide content for display on a device 110 via the computer network 105. The content or content items may include, e.g., text, characters, symbols, images, video, audio, or multimedia content. In one implementation, a content item may include an online advertisement, article, promotion, coupon, or product description.

In one implementation, the data processing system 120 parses a table comprising content group identifiers to compute a mapping to a commercial entity identifier. In one implementation, the data processing system 120 may filter the content group identifiers based on whether the content provider 125 opted in for the systems and methods disclosed herein. The data processing system 120 then queries a content selection data structure extension table with the commercial entity ID to obtain the location extension which contains, e.g., latitude and longitude pairs for the commercial entity's store locations. In one implementation, the data processing system can employ distributed computing on clusters of computers using libraries or programming for processing large data sets.

In some implementations, the data processing system 120 includes an interface 130 designed and constructed to receive the request for content. The interface 130 may be configured to receive a request for content via network 105. The interface 130 can convey information between one or more components of the data processing system or network 105. The interface 130 can be configured to communicate with applications executing on a content provider device 125, content publisher device 115, or device 110. In some implementations, the interface 130 may be configured to convey information via an Application Program Interface ("API"). In some implementations, an application executing on a mobile device may communicate with data processing system 120 via an API configured to communicate with the interface 130.

In some implementations, the data processing system 120 includes a content selector 140 designed and constructed to select a content item based on a search query input via device 110. The data processing system 120 may parse, analyze, match, or otherwise process one or more search terms of the search query to identify one or more candidate content items associated with the search query. In illustrative implementations, the data processing system 120 may receive a search query comprising the term "pizza". The data processing system 120 may then parse a data structure to identify content items related to pizza, such as advertisements or coupons for pizza restaurants. These content items may be provided by one or more content providers 125. In some implementations, the data processing system 120 may select one or more content items to provide for display on the device based on, e.g., an online auction, advertisement score, keyword score, location, or other criteria.

The data processing system 120 may provide the content item to the web page for display in response to receiving a request for content from a computing device such as, e.g., device 110. In some implementations, the data processing system 120 receives the request via an application executing on the device 110. In some implementations, a mobile application executing on a mobile device (e.g., smart phone or tablet) may make a request for content. In some implementations, a web page may request content from the data processing system 120 responsive to a user of a device 110 visiting the web page. In some implementations, the data processing system 120 may receive a request for content via a search engine and responsive to a user of a device 110 entering a search query.

Figure 2:
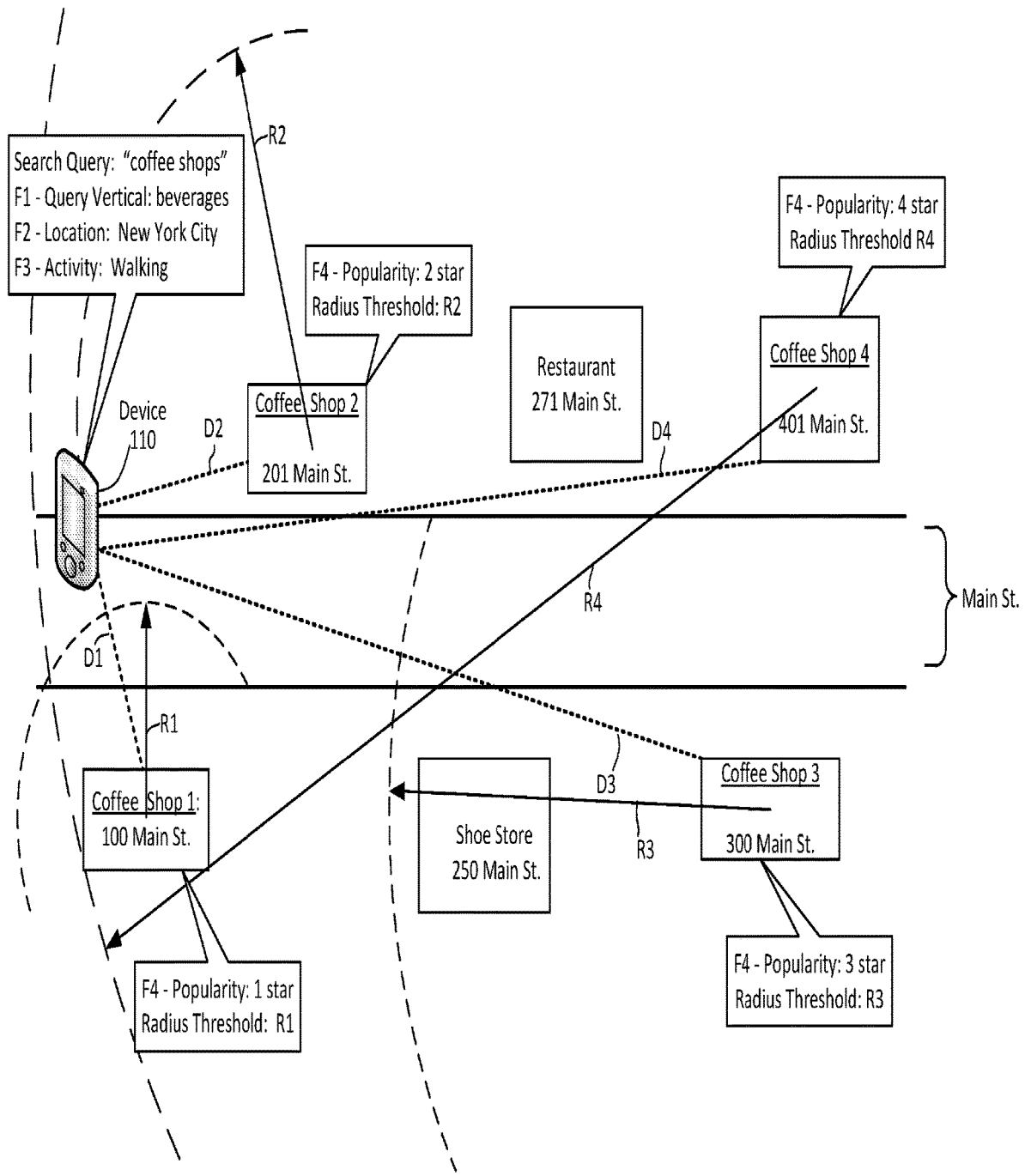
FIG. 2 is an illustration of one implementation of operation of systems and methods of selecting content via a computer network.

In the illustration shown in FIG. 2, the data processing system 120 can receive a search query for "coffee shops" via a device 110. The search query may be input into a search engine accessed via the device 110. The data processing system 120 can receive a request for a content item for display on the device 110. The data processing system 120 may further receive information related to the search query (e.g., keywords, terms, topics) or the search query itself. In some implementations, the request for content items may be a request for content items that are provided for display on a device alongside search results. In some implementations, the request for content items may be a request for content items that are to be displayed on a web page of a web publisher.

In some implementations, the request for content includes information that can facilitate content selection. In some implementations, the data processing system 120 may request information from the device 110 to facilitate identifying content or selecting content. The data processing system 120 may request or obtain information responsive to receiving a request for content from the device 110. The information may include information about displaying the content on the device 110 (e.g., a content slot size or position) or available resources of device 110 to display or otherwise manipulate the content.

In some implementations, the interface 130 receives information associated with a search query which was input into a device. The information may include keywords, terms, concepts of the search query, or the search query itself. In some implementations, the interface 130 receives the information related to the search query via network 105.

The data processing system 120, using the information related to the search query, can identify candidate content items that may be potentially shown. In some implementations, the data processing system 120 can use information associated with the device 110 to select candidate content items. The data processing system 120 can further identify business locations associated with each of the candidate content items. In this illustration, the business locations can include Coffee Shop 1 located at 100 Main St., Coffee Shop 2 located at 201 Main St., Coffee Shop 3 located at 300 Main St., and Coffee Shop 4 located at 401 Main St. In some implementations, a different content item can be associated with each coffee shop. In some implementations, a single content item may be associated with multiple business locations (e.g., a coffee shop chain having more than business location).

Responsive to a request for content from a web page operator 115 (e.g., a search engine provider), the data processing system 120 provides a content item for display (or other presentation) with a web page on a device 110. A user of the device 110 may view the content item (e.g., an impression) or may click on or select the content item (e.g., a click). In one implementation, an indication of interest in the content item may include a click, selection, mouse over, finger gesture, shake motion, voice command, tap, or another indication that indicates interest in the content item. In some implementations, the indication of user interaction may include the user using the content item (e.g., a coupon) to make a purchase at a redemption location.

In some implementations, the data processing system 120 includes a locator 145 designed and constructed to receive or determine location data of or associated with the device 110. In some implementations, the locator 145 receives geo-location data points associated with a device 110. The data processing system can receive the data points via a computer network 105 via a TCP/IP protocol, cell phone data network, or another communication protocol of computer network 105. The data points can include location information, or the data processing system 120 can determine the location information associated with a received data point upon receiving the data point from the device 110. The data processing system 120 can also receive an identifier associated with the data point, such as a unique device identifier, or a username associated with an application executing on the device 110. In one implementation, an application executing on the device 110 (e.g., a mobile application, a mobile operating system, a web browser, a map application, etc.) can transmit the geo-location data point that includes the location information. In one implementation, a mobile device 110 may periodically ping the data processing system 120 or other intermediate system to provide location or time information. In one implementation, a smartphone or other cellular enabled device 110 can ping a cell phone tower system, which may then provide location or time information to the data processing system 120.

To identify a location of the device 110, in some implementations, the data processing system 120 may request location or sensor data from the device 110. In some implementations, the data processing may obtain a device 110 identifier to query a third party for location, such as a carrier or service provider associated with device 110 (e.g., a cell phone service provider or internet service provider). In some implementations, a device 110 may display a prompt or other notification responsive to the request for this information, to which a user of the device may grant or deny the request for information. In some implementations, the device 110 can be configured to provide this information to the data processing system (e.g., push location or sensor data, ping the data processing system 120, etc.). The location or sensor data may correspond to location or sensor information at or about the time of the request for content. In the illustration shown in FIG. 2, the data processing system 120 may determine that the device is located in New York City. The data processing system 120 may further receive sensor data (e.g., accelerometer data, motion data, gyroscope data) and determine whether the device is stationary, walking, driving, on public transportation, etc. In this illustration, the data processing system 120 may determine that the sensor data corresponds to a device activity of "walking".

The data processing system 120 can receive geo-location information, data points or pings responsive to search queries entered into a search engine or other input dialog box via the device 110. In some implementations, the data processing system 120 can receive or determine geo-location information responsive to a request from a content publisher 115 or other web site operator. In some implementations, the data processing system determines the geo-graphic location in real time, or a predetermined time interval such as a periodic basis (e.g., 10 minutes, 5 minutes, 1 minute, 30 seconds, or another period that can facilitate the systems and methods disclosed herein). In one implementation, the device 110 pushes the data points to the data processing system 120 in real-time, periodic basis, or in a batch process. In one implementation, the device 110 that clicked on the content item is different than the device 110 that provides the data points (e.g., a user may use a desktop or laptop computer to click on the content item, and use a mobile device or smart phone to provide data points). In another implementation, the device 110 used to click on the content item is the same as the device 110 used to generate, provide or transmit the data points.

The data points may include, or the data processing system 120 may determine, geographic location information of the geo-location data point based on, e.g., GPS, WI-FI, IP address, BLUETOOTH (e.g., a wireless technology standard for exchanging data over short distances using short-wavelength UHF radio waves from about 2.4 GHz to about 2.5 GHz, standardized as IEEE 802.15.1), near field communication ("NFC"), or cell tower triangulation techniques. In some implementations, the data processing system 120 may determine a latitude and longitude coordinate and identify a larger geographic area or cell comprising the latitude and longitude coordinate. The geographic location may correspond to a latitude or longitude coordinate, or the geographic location may correspond to a larger or smaller area, in some implementations.

In some implementations, the received data points may include, or the data processing 120 may determine, geographic location information including, e.g., latitude and longitude coordinates, geographic information system ("GIS") information, country, state, city, county, town, or precinct. The data processing system 120 may receive or otherwise identify geographic location information associated with the device 110 via an application programming interface ("API") that can provide scripted access to geographic location information associated with the device 110. In one implementation, the geographic API specification may include a specification associated with the WORLD WIDE WEB CONSORTIUM ("W3C"). In one implementation, a user of a device 110 proactively declares a location by checking-in to a location or otherwise declaring to an application executing on the device 110 or to the data processing system that the user is at a location.

In some implementations, the geographic location of the device 110 can be determined via at least one of a global positioning system ("GPS"), cell tower triangulation, or WI-FI hotspots (wireless local area network based on a wireless standard such as IEEE 802.11). In some implementation, the data processing system 120 can identify or determine the technique used to determine a geographic location in order to determine an accuracy of the determined geo-location data point (e.g., GPS-based location information may be more accurate than IP-based location information). The data processing system 120 can also determine geographic location information based on an interaction with an information resource. In some implementations, the device 110 may include a global positioning system ("GPS"). In some implementations the data processing system 120 may determine a geographic location based on an internet protocol ("IP") address. In one implementation, the device 110 may include a GPS sensor or antenna and be configured to determine a GPS location of the device 110. The data processing system 120 can also determine the geographic location by using information obtained from one or more cell towers to triangulate the location of the device 110. In one implementation, the geographic location determined based on information received from one cell tower, two cell towers or three cell towers may be sufficient for content selection. In some implementations, WI-FI hotpots may facilitate determining a geographic location because WI-FI hotspots may be stationary and can be used as a landmark. In one implementation, the relation of a device 110 with respect to a WI-FI hotspot can facilitate determining a geographic location of the device 110.

In some implementations, the data processing system 120 includes a feature generator 135 designed and constructed to identify, determine or generate a feature representation (or feature value) for one or more features. A feature can denote a piece of information that facilitates systems and methods of selecting content, such as a distinguishing characteristic or attribute associated with the request for content or other data associated with the request for content.

To identify feature representations or values, the feature generator 135 can evaluate one or more of location data, sensor data, information related to a search query, and business locations of the content items selected by the content selector 140. The feature generator 135 may identify feature representations (e.g., feature values, feature indications, feature identifiers) for one or more features or for each feature in a predetermined list of features including, e.g., business location popularity, search query vertical, query data, device location, source of device location, or device activity. Feature representations may be represented as a value, numerical value, score, weight, percentage, text, symbol, grade, letter grade, color, character or other indicator that can represent a feature value of a feature of the predetermined list of features. In some implementations, a feature representation or value may include a null value (e.g., insufficient or non-existent data to identify a feature representation).

In some implementations, the feature generator 135 evaluates information related to a search query to generate a feature value for feature "search query vertical". The feature generator 135 can evaluate the search query itself or keywords, terms, concepts, topics, verticals associated therewith to determine the feature value. In illustrative implementations, the information related to a search query may include the search query "best brick oven pizza". The feature generator 135 may parse, analyze, or otherwise process the search query to identify a search query vertical such as "restaurants" or "food". The feature generator 135 may employ a clustering process to identify the search query vertical, or may perform a lookup in a database having one or more terms of the search query to identify a search query vertical.

In the illustration shown in FIG. 2, the data processing system 120, upon receiving, obtaining or determining this information, identifies feature values for the following predetermined list of features: F1) query vertical, F2) location, F3) activity, and F4) popularity. As shown in FIG. 2, the data processing system 120 can determine that a feature value for a query vertical feature F1 is "beverages". The data processing system 120 can make this determination based on the received information related to the search query, such as keywords, terms or concepts of the search query. In some implementations, the data processing system 120 can use a semantic analysis (e.g., statistical semantic analysis, probabilistic latent semantic analysis, or conceptual clustering) to identify a query vertical using information related to the search query.

In some implementations, the feature generator 135 can evaluate the information related to the query to determine a feature value for feature "query information". In some implementations, this feature may represent location terms associated with the query. In an illustrative implementation, a search query may include "pizza palo alto". In this illustration, the feature value for feature "query information" may be a location "palo alto". The data processing system 120 may use this feature value to identify a radius threshold of "palo alto and nearby areas".

In some implementations, the feature generator 135 can evaluate location data to identify a feature value for a device location feature. The feature generator 135 may obtain information from or employ the locator 145 to determine this feature value. The location of the device location may be indicative of how far a user may be willing to travel to a business location. In illustrative implementations, a user in a city or urban location may be willing to travel a shorter distance for a coffee shop as compared to a user in a rural or suburban location.

In the illustration shown in FIG. 2, the data processing system 120 can determine a feature value for the location feature F2 based on location data received or obtained corresponding to the device 120. The location may be identified using location data such as GPS information, timing information, cell phone triangulation information, beacon data, wireless router data, IP address, etc. In some implementations, the data processing system 120 may identify a location as a geographic area, region, tile, or latitude longitude coordinate. In this illustration, the feature value for feature F2 location may include "New York City", "New York", "Northeast", "urban", etc.

In some implementations, the feature generator 135 can evaluate a source of the device location to determine a feature value. The source may refer to a technique used by the data processing system 120 to determine a device location, or the source may refer to an entity, module or sensor that provided location data to the data processing system 120. In some implementations, the location of the device can be determined based on location data or sensor data obtained from the device. The location of the device may also be determined based on information provided by the user of the device (e.g., a location indicated via search preferences, historical query information, IP address, online profile, social network profile, etc.). In some implementations, the data processing system 120 may select different threshold radii based on the source of the location data (e.g., the quality of the location data or how the location was determined). Feature values may include, e.g., GPS, IP, user indication, or search query.

In some implementations, the feature generator 135 can evaluate sensor data associated with the device to generate a feature value based on device activity. The sensor data may include data from sensors of the device 110. The sensor data may include, e.g., accelerometer data, gyroscope data, temperature data, ambient light data, ambient noise data, or battery data. In some implementations, the feature value may indicate that a device is stationary, walking, driving, in a train, etc. In some implementations, the feature value may be a binary value, such as 0 or 1, walking or not walking, yes or no, light or dark, loud or quiet, fast or slow, hot or cold, etc. In some implementations, the feature value may be more granular, such as an approximate speed (e.g., less than 3 miles power hour, between 3 miles power hour and 7 miles power hour, greater than 10 miles power hour, etc.). The feature generator 135 may analyze sensor data over a time interval to determine the device activity feature value. In some implementations, the feature generator 135 may combine location information with sensor data to determine whether a user is walking or not walking. The data processing system 120 may compare a first location ping with a second location ping to determine that a distance and time interval between the two location pings corresponds to stationary, walking or driving.

In the illustration shown in FIG. 2, the data processing system 120 determines a feature value for a device activity feature F3. The data processing system 120 may process sensor data such as accelerometer data to determine that a device is moving at a velocity or speed corresponding to being stationary or walking. In some implementations, the data processing system 120 may determine, based on the sensor data, that the motion of the device corresponds to driving (or otherwise traveling in a vehicle or train).

In some implementations, the feature generator 135 can evaluate information related to a business location to generate a feature value. The feature value may be for a popularity of a business location. The popularity of a business location may be determined using information associated with historical search query logs or other information accessible via one or more databases accessible via network 105. In some implementations, the feature generator 135 can determine the popularity of each business location associated with the content items initially identified by the content selector 140 using information related to the search query.

In the illustration shown in FIG. 2, the data processing system 120 can determine feature values for a popularity feature F4 of a business location. The popularity of a business location can be based on historical search query logs, user reviews, ratings, revenue, size, social network information, news websites or other online documents or information accessible by data processing system 120 via network 105. In some implementations, the data processing system 120 may process historical search query logs to determine the number of searches performed in a search engine for a business location (e.g., "Coffee Shop 1 in New York City", "Coffee Shop 1 near Main Street", or "Coffee Shop 1"). In some implementations, the data processing system 120 may further determine the popularity of a business location based on received indications of interest in content items of the business location. A received indication of interest may include, e.g., a click, selection, gesture, motion, shake, audible command, conversion, or other activity indicative of interest or an activity desired by a content provider.

In some implementations, an indication of interest may include receiving a request for directions to a business location. A search query, such as "coffee shop 1 near main st" may result in a content item for Coffee Shop 1 at 100 Main Street being displayed in device 110. Subsequent to the display of the content item on the device 110, the data processing system 120 may receive a request for directions to the Coffee Shop 1 at 100 Main Street.

A popularity may be determined based on a number of indications of interest, types of indications of interest (e.g., certain types of indication of interest may be weighted more heavily than other types, such as a request for directions may be given a higher weight than just a click or selection without a conversion), a number of indications of interest in a time interval (e.g., 12 hours, 1 day, 3 days, 7 days, 30 days, 60 days, or 90 days), or a performance metric such as click through rate or conversion rate.

In some implementations, the data processing system 120 can determine a popularity of a business location based on a number of searches for the business location using a search engine or maps application (e.g., number of searches in a time interval or all time). In some implementations, the data processing system 120 determines a popularity of a business locations based on online ratings provided via crowd sourcing or other online website, or reviews or ratings provided by users of a social network. In some implementations, the data processing system 120 may parse user reviews to determine a popularity of a business location (e.g., by identifying positive and negative reviews based on positive and negative keywords associated with a business location). The popularity feature value may be a numerical score, letter grade or any other indication of popularity.

The feature value for the popularity feature F4 may include numerical values, symbols, colors, characters, percentages, or other indication that represents a popularity of a business location. In the illustration shown in FIG. 2, the popularity of each coffee shop business location is determined based on online reviews of the coffee shop as follows: Coffee Shop 1's popularity feature value is 1 star; Coffee Shop 2's popularity feature value is 2 star; Coffee Shop 3's popularity feature value is 3 star; and Coffee Shop 4's popularity feature value is 1 star.

Upon identifying the features, the feature generator 135 may access a data structure storing, in a memory element, optimum radii based on a combination of feature values. The data structure may be stored in database 150. The data structure may store an optimum radius for each feature or each unique combination of features. In some implementations, the data structure may be represented as a table with columns and rows as illustrated in Table 1 below:

TABLE 1

Illustrative optimum radii corresponding to feature combinations

| Feature Combination | Optimum Radii |
|---|---|
| {F1_beverages, F2_New_York_City, F3_Walking, F4_1_star} | R1 |
| {F1_beverages, F2_New_York_City, F3_Walking, F4_2_star} | R2 |
| {F1_beverages, F2_New_York_City, F3_Walking, F4_3_star} | R3 |
| {F1_beverages, F2_New_York_City, F3_Walking, F4_4_star} | R4 |

In the illustration shown in FIG. 2, the data processing system 120 can generate, determine, perform a lookup in a data structure storing optimum radii or otherwise identify a radius threshold based on one or more features or the combination of features F1, F2, F3, and F4 associated with the request for a content item. The data structure may store an optimum radius for each feature value combination as follows: optimum radius of R1 for feature value combination {F1_beverages, F2_New_York_City, F3_Walking, F4_1_star}; optimum radius of R2 for feature value combination {F1_beverages, F2_New_York_City, F3_Walking, F4_2_star}; optimum radius of R3 for feature value combination {F1_beverages, F2_New_York_City, F3_Walking, F4_3_star}; and optimum radius of R4 for feature value combination {F1_beverages, F2_New_York_City, F3_Walking, F4_4_star}. Optimum radii may vary from based on the granularity of the location information, and may range from about 100 feet to about 100 miles, or be based on geographic areas or territories such as a city, town, county, or state. In an illustrative implementation, if the optimum radius is a city, the data processing system may determine whether a device is in the identified state to determine whether a content item associated with the business location is eligible for display.

In some implementations, the data processing system 120 can determine a radius threshold based on the combination of feature values by performing a lookup in a data structure storing this information. In the illustrations shown in Table 1, each feature combination may include an individual radius threshold, such as R1, R2, R3 and R4. The radius thresholds may be similar or different from each other.

The data processing system 120 can set, apply, select or otherwise use a radius threshold using the identified optimum radii. In some implementations, the data processing system 120 can set a different radius threshold for each of the business location based on the identified optimum radius corresponding to the feature combination of that business location. In some implementations, the data processing system 120 may determine an average radius threshold based on the identified optimum radii. In some implementations, the data processing system 120 may identify a plurality of business locations corresponding to a single chain business, and determine an optimum radius using an average of the optimum radii of the plurality of business locations of the single chain business.

Upon determining a radius threshold, the data processing system 120 can filter the candidate content items based on the radius threshold(s) to identify eligible content items. The data processing system 120 (e.g., via a locator 145) can use the radius threshold to identify eligible business locations having an associated distance from the device less than the radius threshold. The locator 145 may determine a distance value between the device 110 and one or more business location of the content items initially identified by content selector 140. The locator 145 may then compare some or all of these distance values with the radius threshold to identify business locations falling within the radius threshold.

In the illustration shown in FIG. 2, the data processing system 120 may determine, using location data of the device, a distance between the device 110 and the business location as follows: a distance value of D1 between the device 110 and Coffee Shop 1; a distance value of D2 between the device 110 and Coffee Shop 2; a distance value of D3 between the device 110 and Coffee Shop 3; and a distance value of D4 between the device 110 and Coffee Shop 4. The data processing system 120 may then identify an eligible business location having an associated distance value less than or equal to the radius threshold. In the illustration shown in FIG. 2, the data processing system may determine that D2<R2 and D4<R4, whereas D1>R1 and D3>R3.

If the data processing system 120 determines that a business location is eligible based on the associated distance being less than or less than or equal to a radius threshold, then the data processing system 120 can select a content item (e.g., advertisement or other online document or text) having the business location as a candidate content item for presentation to the device 110. Thus, in the illustration shown in FIG. 2, content items for Coffee Shop 2 and Coffee Shop 4 may be eligible, while content items for Coffee Shop 1 and Coffee Shop 3 may not be eligible. In some implementations, the candidate content item can be displayed on the device 110. In some implementations, the candidate content item can be provided to an online content item auction for further processing and selection.

In the illustrative implementation shown in FIG. 2, the data processing system may determine that Coffee Shops 1 and 4 satisfy a corresponding radius threshold, while Coffee Shops 1 and 3 do not. Coffee Shop 1 may satisfy the radius threshold even though it is the least popular because it is the closest to the device. Coffee Shop 4 may satisfy the radius threshold even though it is the furthest from the device because it is the most popular business location. Coffee Shops 2 and 3 may not satisfy their respective radius thresholds because of their popularity and distance from the device 110.

In some implementations, the data processing system 120 accesses the database storing the optimum radii via network 105. In some implementations, the data processing system 120 generates, maintains or updates the database storing the optimum radii. In some implementations, the data processing system 120 creates the database in an offline process, such as a machine learning process (e.g., logistic regression or decision tree analysis).

In some implementations, the data processing system 120 can generate or maintain the optimum radii for a feature combination. In some implementations, the data processing system 120 includes a machine learning module such as a logistic regression module or decision tree module. In some implementations, the feature generator 135 is configured to perform the machine learning process. The machine learning module can be designed and constructed to generate optimum radii based on feature values by correlated the presence of a feature of combination of features with an indication of interest and a corresponding distance. In an illustrative implementation, the data processing system 120 may determine that presenting content items for Coffee Shop 1 (shown in FIG. 2) is correlated with a click through rate of 0.1 (or 100 clicks per 1000 impressions) when the content item is presented on a device that is less than R1 distance from the business location and the presentation of the content item is associated with feature values: F1) beverages, F2) New York City, F3) Walking, and F4) popularity 1 star. If the performance metric threshold is 0.1, then the data processing system 120 may determine that a content item for Coffee Shop 1 is not eligible for display on device 110 of FIG. 2 because the distance D1 between device 110 and Coffee Shop 1 is greater than radius threshold R1, as illustrated in FIG. 2.

Inputs to the machine learning module may include historical search query logs and a list of features. The historical search query logs may include impression records, sensor data, device location data, search query information, business location information, interest data, performance data, etc. Historical search query logs may include logs for a certain time interval (e.g., last 7 days, 30 days, or 60 days). The historical search query logs may include information related to content item impressions (e.g., when a content item is presented for display on a device or otherwise presented via a device). The information may include information related to a search query that resulted in the content item impression, sensor data associated with the device making the request for content, a business category/vertical, a business location address, a distance between the device and the business location, an indication as to whether a link for "directions to business location" associated with the advertisement was selected via the device.

The historical search query logs may include indications of requests for directions to a business location. In some implementations, the search query logs may include a distance between a device that indicated an interest in a business location of a content item and the business location. The data processing system 120 may use these distance values to generate a radius threshold. In some implementations, the data processing system 120 may identify optimum radii based on a click through rate or conversion rate correlated with distances and feature combinations.

Additional input information to the machine learning module may include a predetermined list of features such as search query vertical, location, activity, popularity, time of day, weather, language, etc. The machine learning module may use these inputs to generate scores associated with feature values. The scores may be indicative of a likelihood of interest when a content item request corresponds to a feature combination. In some implementations, the data processing system can determine an optimum radius for each feature combination based on the machine learning module. In illustrative implementations, the data processing system 120 can determine that a certain feature combination corresponds to a high click through rate or conversion rate for a certain radius. The data processing system may determine, for each feature combination, an optimum radius threshold based on this performance.

In some implementations, when generating the model, the data processing system can process the search history logs to determine a click through rate or conversion rate in the presence of one or more features for a given distance. The distance can be bucketized based on the available data (e.g., buckets of 0.1 mile, 0.05 mile, 0.25 mile, etc.).

In some implementations, when generating the model, the data processing system can weight each feature or feature combination. To weight features, the data processing system can correlate the presence of a feature or feature combination with the presence of a click or other indication of interest (e.g., a request for directions or a conversion). A weight can be assigned to a feature or feature combination based on the correlation. The weight may indicate a probability that a click may occur in the presence of this feature or feature combination. The weights can be a numerical value, letter, grade, symbol, etc. The weight can include a range, such as 0 to 1, −1 to 1, 0 to 100, 1 to 100, or any other range that facilitates the systems and methods of selecting content.

In some implementations, the data processing system 120 may determine that a presence of a first feature is more highly correlated with a presence of a click, than the presence of a second feature. In illustrative implementations, the data processing system 120 may determine that feature values corresponding to walking are highly correlated with indications of interest based on a certain distance, whereas feature values corresponding to a source of device location (e.g., GPS vs. cell phone triangulation) is not heavily correlated with indications of interest based on distance. Thus, the data processing system may apply a first weight to the feature value for walking, and apply a second weight to the feature value for source of device location such that the feature value for walking plays a larger role in determining the optimum radius.

The data processing system can store, in a data structure, a click through rate corresponding to a feature or feature combination and a distance. The distance may include an average distance for all business locations associated with the same or similar feature values (e.g., all 4 star business locations of a chain). In some implementations, where the distance is bucketized (e.g., 0.1 mile buckets), the data processing system may determine an average distance value for a bucket using samples in a bucket.

The data processing system 120 determines an optimum radius for a feature combination based on distance values associated with a performance metric that satisfies a performance metric threshold. In some implementations, the data processing system stores feature combinations and corresponding distance values where the corresponding click through rate (or other indication of interest) is above a threshold (e.g., a click through rate threshold based on a number of clicks per thousand impressions, such as about 0.1, 0.2, 0.01, 0.02, 0.03, 0.005, 0.05, or range from about 0.01 to about 0.5, etc.). In some implementations, the click through rate threshold can be established by an administrator of the data processing system 120. In some implementations, the click through rate threshold can be established via a logistic regression an analyses to identify an optimal click through rate threshold.

In some implementations, the data processing system 120 can determine the optimum radius by analyzing the performance metric corresponding to a feature combination for multiple radii. The data processing system 120 may identify a trend in the performance metric as the radii increases or decreases, and select a radius threshold (or optimum radii) based on this trend. In an illustrative implementation, the data processing system 120 may determine that the highest click through rate is associated with a radius of R1, and that the click through rate changes (e.g., a percentage drop, a slope in a graph, or other statistical value) when devices are further than R1 from the business location. Thus, in some implementations, the data processing system 120 may select the optimum radii for a combination of features by evaluating click through rates associated with multiple distances. In some implementations, radius thresholds can range from about 0.1 mile to about 20 miles. In some implementations, radius threshold can range up to about 100 miles, or be based on geographic areas, regions, or boundaries (e.g., a radius threshold may include New York City).

During serving time, in some implementations, the data processing system can perform a lookup based on the given feature combination. In some implementations, the data processing system may also perform the lookup based on a desired click through rate threshold. The output may include a radius threshold. For a given set of features and a desired click through rate or probability of click/conversion, the data processing system can selects or identify a radius threshold.

Thus, the data processing system can extract one or more features from search query logs and correlate the features with indication of interest (e.g., requests for directions to business location associated with the content item). A machine learning mechanism of the data processing system 120 can predict the likelihood of interest in a business location based on these features and distance between a device and the business location.

In the illustration shown in FIG. 2, the data processing system 120 may determine that feature combination {F1_beverages, F2_New_York_City, F3_Walking, F4_4_star} is correlated with a satisfactory click through rate up to a first distance, but that the click through rate drops below a click through rate threshold above a second distance. The data processing system may determine an optimum radius based on the first and second distances (e.g., the distance beyond which performance of content items associated with the feature combination falls below a performance threshold).

Figure 3:
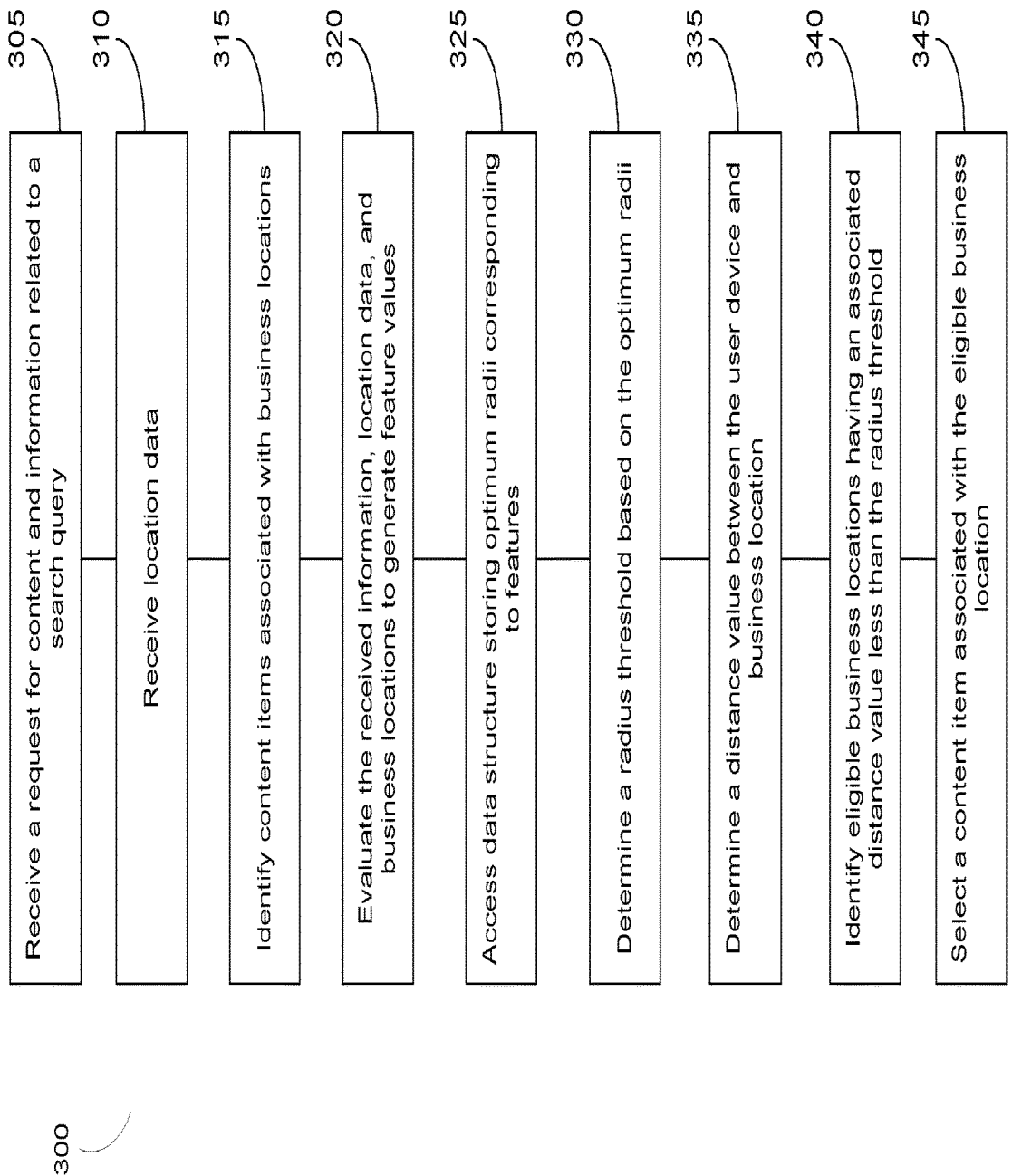
FIG. 3 is an illustration of one implementation of a method of selecting content via a computer network.

FIG. 3 is an illustration of one implementation of a method of selecting content via a computer network. The method can be performed by a data processing system having one or more processors. In brief overview, at 305, the method includes the data processing system receiving a request for content and information related to a search query. At 310, the method includes the data processing system receiving location data. The data processing system can identify content items associated with business locations at 315. At 320, the method includes the data processing system evaluating the received information, location data, and business location to generate feature values. At 325, the method includes the data processing system accessing a data structure storing optimum radii corresponding to features. At 330, the method includes the data processing system determining a radius threshold based on the optimum radii. At 335, the method includes the data processing system determining a distance value between the device and one or more business location. At 340, the method includes the data processing system identifying eligible business locations having an associated distance value less than the radius threshold. At 345, the method includes the data processing system selecting a content item associated with the eligible business location.

In further detail, at 305, the method includes the data processing system receiving a request for content and information related to a search query. The data processing system may receive the request for content via an interface. The request for content may be for a content item to be displayed alongside search results provided by a search engine. The data processing system may receive the request via an interface. The request for content may include, be accompanied by, or otherwise associated with additional information to facilitate content selection. In some implementations, upon receiving the request for content, the data processing system may request additional information for content selection. The data processing system may prompt a user of a device for additional information, or request additional information from an entity of the search engine, content provider, or content publisher.

In some implementations, the data processing system receives the request for content responsive to a search query input into a device. The search query may be input into an input text box or other graphical user interface element associated with a website such as a search engine. The data processing system may receive the search query or keywords, terms, concepts, verticals, topics associated with the search query.

At 310, the method includes the data processing system receiving location data. The data processing system (e.g., via a locator) may receive location information indicative of a location of the device in which the search query was input. In some implementations, the method includes the data processing sending a request to the device for location data. In some implementations, the device transmits the location data along with the request, or based on another time interval.

The data processing system (e.g., via a content selector) can identify content items associated with business locations at 315. The method can include identifying a first set of content items based on information associated with the request for content. This first set of content items can be later filtered based on a radius threshold to identify an eligible content item.

The identified content items can include one or more business locations. In some implementations, each content item includes a business location. In some implementations, one or more content items may not include a business location, in which case the data processing system may not filter the content item based on a radius threshold.

At 320, the method includes the data processing system evaluating the received information, location data, and business location to generate feature values. The data processing system (e.g., via a feature generator) may determine feature values for each feature of a predetermined list of features. In some implementations, one or more feature values may include a null value where the data processing system does not have access to sufficient information or is otherwise unable to or prohibited from determining a feature value for a feature of the predetermined list of features.

At 325, the method includes the data processing system (e.g., via a feature generator) accessing a data structure storing optimum radii corresponding to features. The optimum radii may correspond to a feature combination. In some implementations, a feature combination may include an optimum radius. In some implementations, the data processing system may perform a lookup into the data structure for the optimum radii. In some implementations, the method includes identifying an optimum radius for each feature combination associated with the content request.

At 330, the method includes the data processing system determining a radius threshold based on the optimum radii. In some implementations, the data processing system may identify the optimum radii corresponding to each of the feature combinations associated with the request for content and first set of content items. The method may include the data processing system determining a single radius threshold to use for filtering the first sets of content items (e.g., by averaging the optimum radii or taking a weighted average where the weights can correspond to weights determined by a machine learning module). In some implementations, the method includes applying each of the optimum radii to a corresponding business location associated with the first set of content items.

At 335, the method includes the data processing system (e.g., via a locator) determining a distance value between the device and one or more business locations. In some implementations, the distance may represent an absolute distance value between the device and the business location. In some implementations, the distance value may represent a driving, walking, biking, or public transportation distance. In some implementations, rather than a distance value, the data processing system may utilize a travel time. The travel time may be for walking, driving, biking or public transportation. The travel time may be based on current or predicted traffic information. For implementations in which the data processing system uses a travel time rather than a distance value, the data structure may include travel time thresholds in addition to, or in place of, radius thresholds.

At 340, the method includes the data processing system identifying eligible business locations having an associated distance value less than the radius threshold. Each business location may be associated with a respective radius threshold based on the feature combination. One or more business locations may be associated with a same feature combination, in which case the business location may be associated with the same radius threshold. However, if a first business location is within the radius threshold, and the second business location is not, an eligible content item may only display the eligible business location. In some implementations, an eligible content may include multiple eligible business locations.

At 345, the method includes the data processing system selecting a content item associated with or including information related to the business location. The data processing system (e.g., via content selector) may select the eligible content from the first set of content items that was initially identified based on the information related to the search query. In some implementations, the content selector identifies the first set of content items using some or all of the information used to generate feature values. The first set of content items can then be filtered or otherwise processed to identify one or more eligible business locations of the content items based on an optimum radius threshold.

In some implementations, the method includes selecting a larger radius threshold for business locations that are more popular because a machine learning module may determine that traveling long distances is correlated with visiting a popular location, as opposed to an unpopular location. In an illustrative implementation, a restaurant location having a five star rating may be associated with a radius of 20 miles, whereas a restaurant location having a 2 star rating may be associated with a radius of 2 miles. The two restaurant locations may be similar in all other respects except for the popularity rating.

In some implementations, a first device may be associated with a device activity of walking and a second device may be associated with a device activity of driving. If all other feature values are similar, the data processing system may determine that a radius threshold for a barber shop location may be 0.5 miles for the first device, while a radius threshold for the same barber location may be 5 miles for the second device.

Thus, systems and methods of the present disclosure facilitate dynamically selecting a radius threshold based on a combination of feature values of a content request that are correlated with satisfactory, high, or optimum performance (likelihood of interest, relevancy, click through rate or conversion rate).

Figure 4:
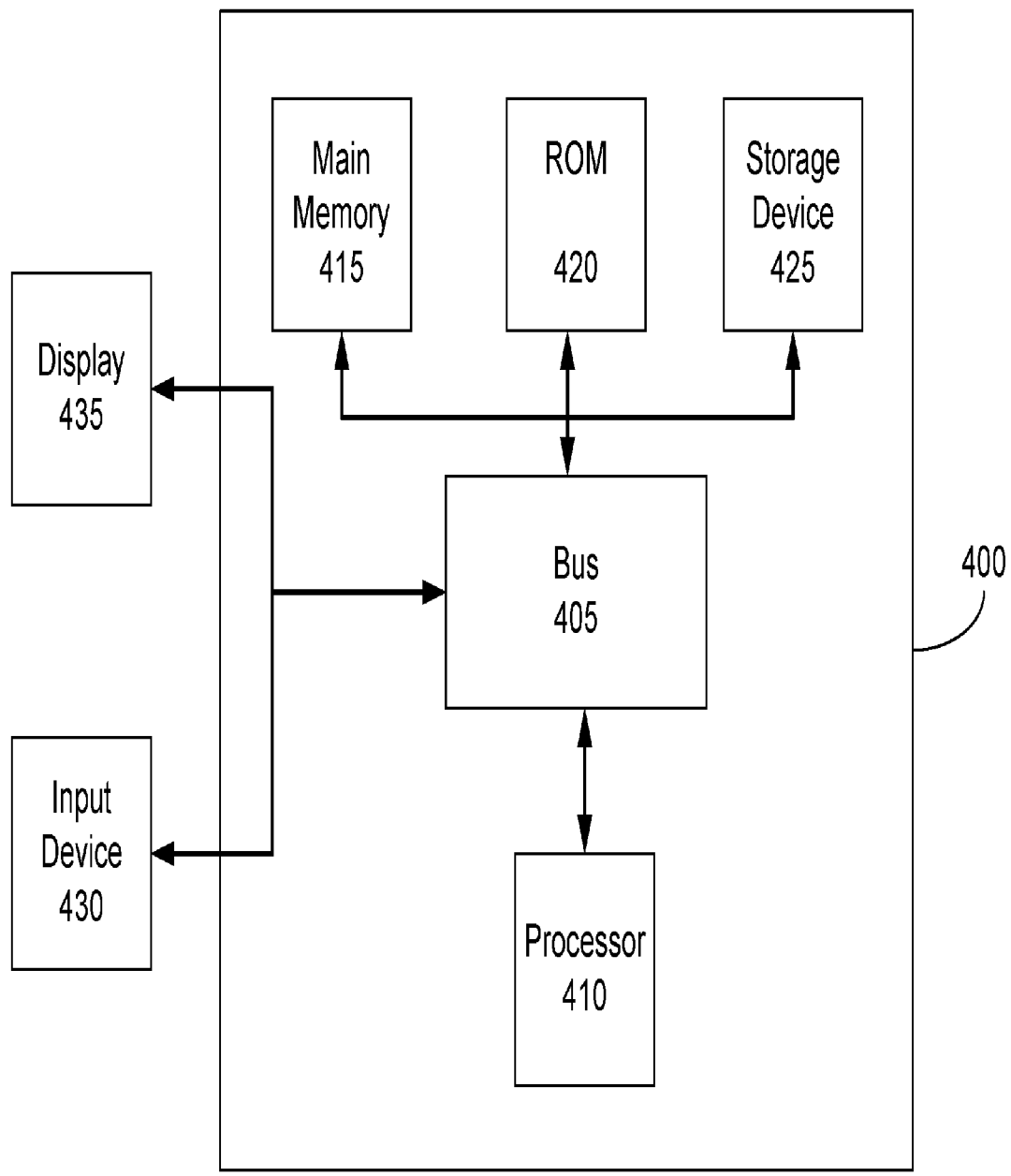
FIG. 4 is a block diagram illustrating a general architecture for a computer system that may be employed to implement various elements of the systems and methods described herein, in accordance with an implementation.

FIG. 4 is a block diagram of a computing system 400 in accordance with an illustrative implementation. The computing system or computing device 400 can be used to implement the system 100, content provider 125, device 110, content publisher 115, data processing system 120, interface 130, feature generator 135, content selector 140, locator 145, and machine learning module. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although a computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including without limitation a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, without limitation, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including without limitation semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; in most implementations, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A method of selecting content for a computing device, comprising:

receiving, by one or more processors of a data processing system, from a client computing device, location data of the client computing device;

identifying, by the data processing system, an entity around a location of the client computing device;

generating, by the data processing system, a database indicating a plurality of radius thresholds associated with a plurality of respective feature combinations, at least in part by (i) using a machine learning model to predict performance metric values associated with different distance values and different feature combinations and (ii) comparing the predicted performance metric values to a performance metric criterion to identify the radius thresholds;

identifying, by the data processing system, a radius threshold corresponding to the entity based on (i) a particular feature combination associated with the entity and the client computing device and (ii) a particular radius threshold that is associated with the particular feature combination in the database;

determining, by the data processing system, that a distance between the client computing device and the entity is less than the radius threshold corresponding to the entity; and transmitting, by the data processing system, responsive to the determination, to the client computing device, a content item associated with the entity.

2. The method of claim 1, wherein:

at least one feature combination of the plurality of respective feature combinations includes a set of features associated with at least one of a plurality of entities, a plurality of client computing devices, or search queries from the plurality of client computing devices; and the performance metric values associated with the different distance values and the different feature combinations include indications of interest in content items associated with the plurality of entities.

3. The method of claim 2, wherein the particular feature combination includes at least one of a popularity of the entity, a search query vertical associated with the search query, query data associated with the search query, a location of the client computing device, or an activity of the client computing device.

4. The method of claim 3, wherein the particular feature combination includes the popularity of the entity, and wherein the popularity of the entity is positively correlated to a distance from the entity to a client computing device that interacts with a reference associated with the entity.

5. The method of claim 1, wherein the performance metric values associated with the different distance values and the different feature combinations include values for at least one of click through rate, conversion rate, rate of requests for directions to a business location, predicted click through rate, cost per click, predicted cost per click, or return on investment.

6. The method of claim 1, wherein the performance metric criterion includes a requirement that a predicted performance metric value associated with the identified radius threshold exceeds a performance metric threshold.

7. The method of claim 1, wherein the performance metric criterion includes a requirement that a predicted performance metric value associated with the identified radius threshold have a greatest value among a plurality of performance metric values associated with the entity.

8. The method of claim 1, wherein transmitting the content item associated with the entity includes:

identifying a first set of candidate content items based on a search query from the client computing device;

selecting a second set of candidate content items from the first set of candidate content items based on indications of interest associated with the first set of candidate content items;

identifying one or more candidate content items of the second set of candidate content items, the one or more candidate content items being associated with the entity;

selecting the content item from the one or more candidate content; and transmitting, to the client computing device, the content item of the one or more candidate content items.

9. A system for selecting content for a computing device, comprising:

a data processing system comprising one or more processors, and a network interface in communication with a client computing device;

wherein the one or more processors are configured to:

receive, from the client computing device, location data of the client computing device;

identify an entity around a location of the client computing device;

generate a database indicating a plurality of radius thresholds associated with a plurality of respective feature combinations, at least in part by (i) using a machine learning model to predict performance metric values associated with different distance values and different feature combinations and (ii) comparing the predicted performance metric values to a performance metric criterion to identify the radius thresholds;

identify a radius threshold corresponding to the entity based on (i) a particular feature combination associated with the entity and the client computing device and (ii) a particular radius threshold that is associated with the particular feature combination in the database;

determine that a distance between the client computing device and the entity is less than the radius threshold corresponding to the entity; and transmit, responsive to the determination, to the client computing device, a content item associated with the entity.

10. The system of claim 9, wherein:

at least one feature combination of the plurality of respective feature combinations includes a set of features associated with at least one of a plurality of entities, a plurality of client computing devices, or search queries from the plurality of client computing devices; and the performance metric values associated with the different distance values and the different feature combinations include indications of interest in content items associated with the plurality of entities.

11. The system of claim 10, wherein the particular feature combination includes at least one of a popularity of the entity, a search query vertical associated with the search query, query data associated with the search query, a location of the client computing device, or an activity of the client computing device.

12. The system of claim 9, wherein the performance metric criterion includes a requirement that a predicted performance metric value associated with the identified radius threshold exceeds a performance metric threshold.

13. The system of claim 9, wherein the performance metric criterion includes a requirement that a predicted performance metric value associated with the identified radius threshold have a greatest value among a plurality of performance metric values associated with the entity.

14. The system of claim 9, wherein to transmit the content item associated with the entity, the one or more processors are further configured to:

identify a first set of candidate content items based on a search query from the client computing device;
select a second set of candidate content items from the first set of candidate content items based on indications of interest associated with the first set of candidate content items;
identify one or more candidate content items of the second set of candidate content items, the one or more candidate content items being associated with the entity;
select the content item from the one or more candidate content; and
transmit, to the client computing device, the content item.

* * * * *